March 31, 1931.  E. G. McDONALD  1,798,549
BRAKE OPERATING MECHANISM
Filed Oct. 6, 1928
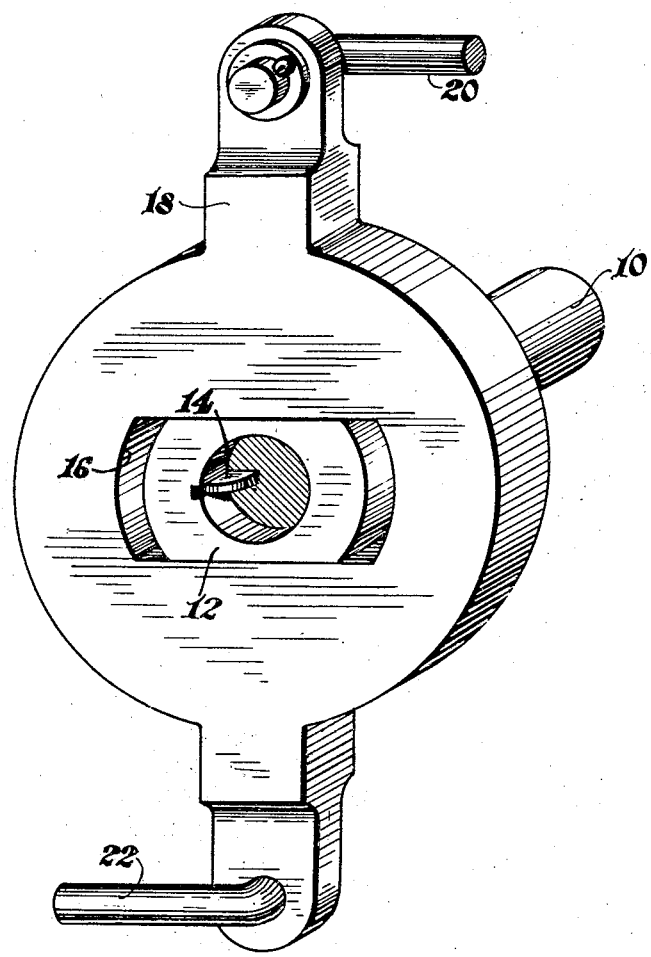
INVENTOR.
Eugene G. McDonald
BY
ATTORNEY Patented Mar. 31, 1931

1,798,549

UNITED STATES PATENT OFFICE

EUGENE G. McDONALD, OF SOUTH BEND, INDIANA, ASSIGNOR TO BENDIX BRAKE COMPANY, OF SOUTH BEND, INDIANA, A CORPORATION OF ILLINOIS

BRAKE-OPERATING MECHANISM

Application filed October 6, 1928. Serial No. 310,852.

This invention relates to brakes, and is illustrated as embodied in part of a system of operating mechanism for a set of four-wheel automobile brakes. An object of the invention is to provide simple means through which a shaft mounted in fixed bearings may have an equalizing action in operating the brakes or their equivalent.

In one desirable arrangement, the shaft has a flattened part, preferably keyed thereto, slidably received in a slot in an intermediate portion of a double lever connected at its ends to the brakes or the like.

The above and other objects and features of the invention, including various novel and desirable details of construction, will be apparent from the following description of one illustrative embodiment shown in the accompanying drawing, in which:

The figure is a partial perspective of the end of the shaft and associated parts.

In the drawing, a shaft 10 mounted rotatably in fixed bearings (not shown) has at its ends a flattened part 12, preferably formed separately from the shaft and secured to rotate therewith by means such as a key 14. The flattened part 12 is slidably received in a transverse horizontal slot 16 in an intermediate portion of a vertically-arranged double lever 18 having connected at its ends force-transmitting members 20 and 22 extending in opposite directions to the front and rear brakes or their equivalents.

In operation, rotation of the brake cross or rock shaft 10 by the driver operated service pedal serves to transmit the driving torque to the double lever 18, which torque is equally distributed to the force-transmitting members 20 and 22 by virtue of the balancing action of said lever, the same sliding to balance said forces along the flattened part 12 of the rock shaft.

While one illustrative embodiment has been described in detail, it is not my intention to limit the scope of the invention to that particular embodiment, or otherwise than by the terms of the appended claim.

I claim:

An operating device for a system of brakes comprising, in combination, a rock shaft having a separately-formed flattened part keyed thereto at its end, a double lever having between its ends a portion formed with a transverse slot slidably embracing said flattened part, and force-transmitting tension element connected one to each end of said lever and extending in opposite directions therefrom.

In testimony whereof, I have hereunto signed my name.

EUGENE G. McDONALD.